(12) United States Patent
Yamakawa (10) Patent No.: US 9,118,483 B2
(45) Date of Patent: Aug. 25, 2015

(54) COMMUNICATION SYSTEM, RELAY DEVICE, AND NON-TRANSITORY COMPUTER READABLE MEDIUM

(71) Applicant: FUJI XEROX CO., LTD., Minato-ku, Tokyo (JP)

(72) Inventor: Yukio Yamakawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/074,979

(22) Filed: Nov. 8, 2013

(65) Prior Publication Data

US 2014/0289531 A1 Sep. 25, 2014

(30) Foreign Application Priority Data

Mar. 19, 2013 (JP) ................................. 2013-056304

(51) Int. Cl.
*H04L 29/06* (2006.01)
*H04L 9/32* (2006.01)
*H04L 12/933* (2013.01)
*H04L 12/801* (2013.01)

(52) U.S. Cl.
CPC ............ *H04L 9/3263* (2013.01); *H04L 9/3247* (2013.01); *H04L 47/10* (2013.01); *H04L 49/15* (2013.01); *H04L 63/0815* (2013.01)

(58) Field of Classification Search
CPC .................................................. H04L 63/0815
USPC ....................................................... 713/176
See application file for complete search history.

(56) References Cited

U.S. PATENT DOCUMENTS

| 5,475,758 A | 12/1995 | Kikuchi |
| 6,938,171 B1 * | 8/2005 | Isomichi et al. ................ 726/12 |
| 2002/0052796 A1 | 5/2002 | Tadokoro et al. |
| 2004/0098595 A1 * | 5/2004 | Aupperle et al. ............. 713/185 |
| 2005/0144463 A1 * | 6/2005 | Rossebo et al. ............... 713/185 |

FOREIGN PATENT DOCUMENTS

| JP | 06-223041 A | 8/1994 |
| JP | 11-025048 A | 1/1999 |
| JP | 2002-132714 A | 5/2002 |

* cited by examiner

*Primary Examiner* — Jason K Gee
(74) *Attorney, Agent, or Firm* — Sughrue Mion, PLLC (57) ABSTRACT

A communication system includes a first relay device connected to a first network accessible by any user, and a second relay device connected to a second network accessible by a specific user. The first relay device includes a first receiver, a first authentication information acquisition unit, and a first transmitter. The first receiver receives an electronic certificate from a terminal device of the specific user. The first authentication information acquisition unit acquires authentication information. The first transmitter transmits the authentication information to a service device connected to the first network, and transmits the electronic certificate to the second relay device. The second relay device includes a second receiver, a second authentication information acquisition unit, and a second transmitter. The second receiver receives the electronic certificate. The second authentication information acquisition unit acquires authentication information. The second transmitter transmits the authentication information to a service device connected to the second network.

5 Claims, 7 Drawing Sheets

| NAME | SERVICE NAME | AUTHENTICATION INFORMATION ||
| --- | --- | --- | --- |
| | | USER NAME | PASSWORD |
| John Doe | SERVICE A | AAA | ZZZ |
| | SERVICE B | AAA | ZZZ |

FIG. 4B

| NAME | SERVICE NAME | AUTHENTICATION INFORMATION ||
| --- | --- | --- | --- |
| | | USER NAME | PASSWORD |
| John Doe | SERVICE C | AAA | ZZZ |
| | SERVICE D | AAA | ZZZ |

COMMUNICATION SYSTEM, RELAY DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-056304 filed Mar. 19, 2013.

BACKGROUND

Technical Field

The present invention relates to a communication system, a relay device, and a non-transitory computer readable medium.

SUMMARY

According to an aspect of the invention, there is provided a communication system including a first relay device and a second relay device. The first relay device is connected to a first network accessible by a specific user and a user other than the specific user, and the second relay device is connected to a second network accessible by the specific user. The first relay device includes a first receiver, a first authentication information acquisition unit, and a first transmitter. The first receiver receives an electronic certificate transmitted from a terminal device of the specific user. The first authentication information acquisition unit acquires, from a first memory, authentication information associated with a name written in the electronic certificate received by the first receiver. The first memory is provided in the first network, and stores the authentication information. The first transmitter transmits the authentication information acquired by the first authentication information acquisition unit to a service device connected to the first network and configured to provide a service, and transmits the electronic certificate received by the first receiver to the second relay device. The second relay device includes a second receiver, a second authentication information acquisition unit, and a second transmitter. The second receiver receives the electronic certificate transmitted by the first transmitter. The second authentication information acquisition unit acquires, from a second memory, authentication information associated with a name written in the electronic certificate received by the second receiver. The second memory is provided in the second network, and stores the authentication information. The second transmitter transmits the authentication information acquired by the second authentication information acquisition unit to a service device connected to the second network and configured to provide a service.

BRIEF DESCRIPTION OF THE DRAWINGS

An exemplary embodiment of the present invention will be described in detail based on the following figures, wherein.

DETAILED DESCRIPTION

Exemplary Embodiment

Overall Configuration

Figure 1:
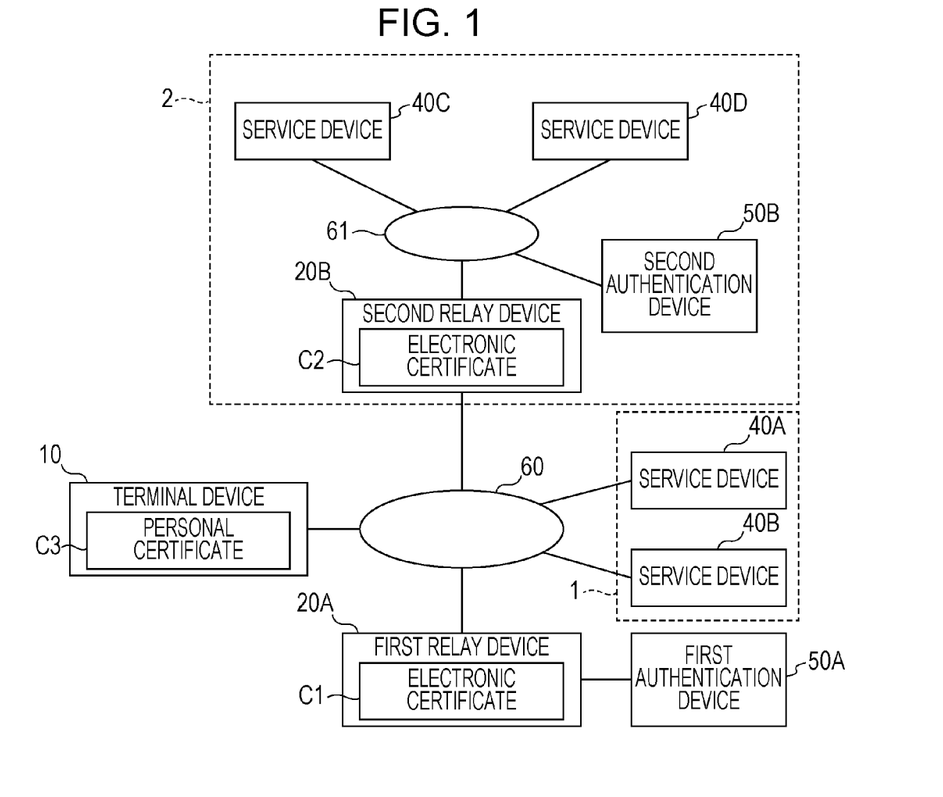
FIG. 1 illustrates devices according to an exemplary embodiment of the present invention.

FIG. 1 illustrates devices according to an exemplary embodiment of the present invention. Each of the devices illustrated in FIG. 1 may be a single device or multiple devices.

A network 60 is a communication line through which computer devices are connected to one another, and may be, for example, the Internet. The network 60 is an example of a first network accessible by unspecified users. The network 60 is not limited to the Internet, and may be any network including a telephone network, a mobile communication network, and so forth as long as it is used to connect computer devices to one another.

A terminal device 10 is a computer device configured to communicate with another computer device via the network 60, and may be, in this exemplary embodiment, a tablet terminal. The terminal device 10 is not limited to a tablet terminal, and may be any other computer device configured to communicate with another computer device via the network 60, such as a smartphone or a desktop personal computer. The terminal device 10 stores a program implementing a web browser, and accesses another computer device using the web browser. The terminal device 10 has a function to perform communication using a public-key cryptosystem, and stores a personal certificate C3 that is an electronic certificate of a user of the terminal device 10 (hereinafter referred to as a "user U").

Service devices 40A, 40B, 40C, and 40D are devices configured to provide the user U with various services such as modifying or saving a file, which is an example of information. In this exemplary embodiment, the service device 40A provides a service to store a file transmitted from the terminal device 10, and a service to transmit a file stored therein to the terminal device 10. In this exemplary embodiment, furthermore, the service device 40B provides a service to convert the format of a transmitted file, the service device 40C provides a service to translate a file of English text into a file of Japanese text, and the service device 40D provides a service to recognize text in an image file of a document and generate a file including the recognized text as text data. The service devices 40A, 40B, 40C, and 40D have substantially the same hardware configuration although the services to be provided are different, and will thus be collectively referred to as "service devices 40" or individually referred to as a "service device 40" unless they are individually identified. In the following description, for convenience of description, the service provided by the service device 40A may be named "service A", the service provided by the service device 40B may be named "service B", the service provided by the service device 40C may be named "service C", and the service provided by the service device 40D may be named "service D".

A first authentication device 50A is connected to a first relay device 20A. The first authentication device 50A stores information necessary for the user U to log into the service devices 40A and 40B, information indicating a service which the user U is authorized to use among the services provided by the service devices 40A and 40B, and so forth. A second authentication device 50B is connected to a second relay device 20B. The second authentication device 50B stores information necessary for the user U to log into the service devices 40C and 40D, information indicating a service which the user U is authorized to use among the services provided by the service devices 40C and 40D, and so forth.

The first relay device 20A is a computer device having a function to perform communication using a public-key cryptosystem. The first relay device 20A is an example of a first relay device having functions to relay information, such as a function to transfer information transmitted from the terminal device 10 and a function to transfer information transmitted from the second relay device 20B to the terminal device 10.

The second relay device 20B is a computer device having a function to perform communication using a public-key cryptosystem. The second relay device 20B is an example of a second relay device having functions to relay information, such as a function to transfer information transmitted from the first relay device 20A to the service device 40C or the service device 40D and a function to transfer information transmitted from the service device 40C or 40D to the first relay device 20A.

In this exemplary embodiment, the second relay device 20B, the service devices 40C and 40D, and the second authentication device 50B set up a private cloud 2. The private cloud 2 is an example of a system that is an in-house system built by a company to which the user U belongs and that is configured to provide services to members who belong to the company. The devices included in the private cloud 2 are connected to a network 61 accessible from the terminal devices 10 of the members who belong to the company. The network 61 is an example of a network accessible by the members who belong to the company to which the user U belongs to, that is, an example of a second network accessible by a specific user. In this exemplary embodiment, furthermore, the service devices 40A and 40B are included in a public cloud 1. The public cloud 1 is an example of a system configured to provide services to unspecified users. The first relay device 20A and the second relay device 20B function as a communication system configured to relay information.

Configuration of Service Devices 40

Figure 2:
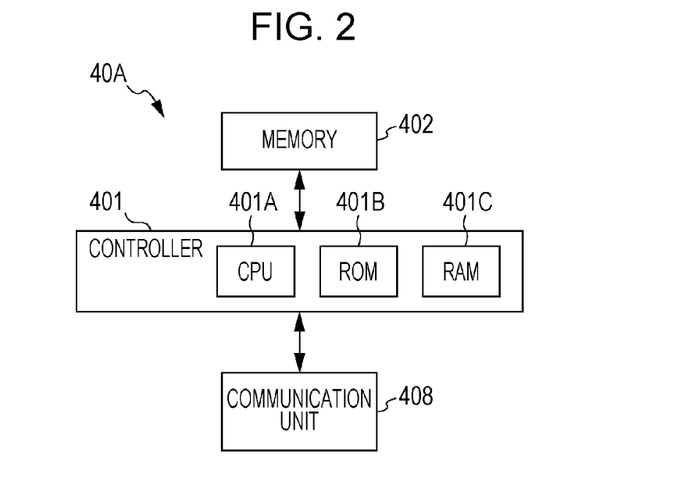
FIG. 2 illustrates a hardware configuration of a service device.

FIG. 2 illustrates a hardware configuration of the service device 40A. A communication unit 408 is connected to a communication line through which the service device 40A and the first relay device 20A are connected to each other, and communicates with the first relay device 20A. A memory 402 has a hard disk device, and stores a program implementing an operating system, a program implementing the service A, and so forth. The memory 402 further stores authentication information (for example, a user name and a password) for authenticating a user who is authorized to use the service A.

A controller 401 includes a central processing unit (CPU) 401A, a read only memory (ROM) 401B, and a random access memory (RAM) 401C. The CPU 401A executes an initial program loader (IPL) stored in the ROM 401B, and thus the programs stored in the memory 402 are executed, thereby providing the service A to the terminal device 10.

The service devices 40B, 40C, and 40D have substantially the same hardware configuration as the service device 40A, and the destinations to which the respective communication units 408 of the service devices 40B, 40C, and 40D are connected and the programs implementing the services provided by the service devices 40B, 40C, and 40D to the terminal device 10 are different. The memory 402 of each of the service devices 40B, 40C, and 40D stores authentication information for authenticating a user who is authorized to use a service provided by the associated service device.

Specifically, in this exemplary embodiment, the communication unit 408 of the service device 40B is connected to a communication line through which the service device 40B and the first relay device 20A are connected to each other. The communication unit 408 of the service device 40C is connected to a communication line through which the service device 40C and the second relay device 20B are connected to each other, and the communication unit 408 of the service device 40D is connected to a communication line through which the service device 40D and the second relay device 20B are connected to each other. In this exemplary embodiment, furthermore, the service device 40B stores a program implementing the service B, the service device 40C stores a program implementing the service C, and the service device 40D stores a program implementing the service D. In this exemplary embodiment, furthermore, the respective memories 402 of the service devices 40A, 40B, 40C, and 40D store authentication information on the user U.

Configuration of First Authentication Device 50A and Second Authentication Device 50B

Figure 3:
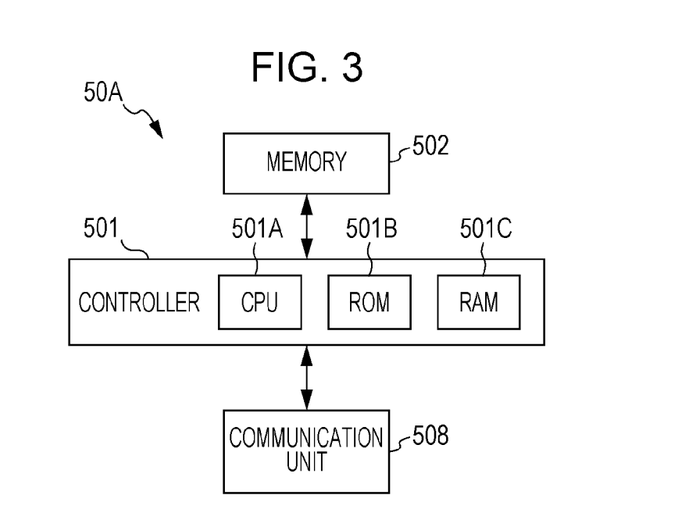
FIG. 3 illustrates a hardware configuration of a first authentication device.

FIG. 3 illustrates a hardware configuration of the first authentication device 50A. A communication unit 508 is connected to a communication line through which the first authentication device 50A and the first relay device 20A are connected to each other, and communicates with the first relay device 20A. A memory 502 has a hard disk device, and stores the name of a service which the user U is authorized to use among the services provided by the service devices 40A and 40B, and authentication information for allowing the user U to log into the service devices 40A and 40B. The memory 502 further stores a program implementing an operating system, and a program implementing a function to provide the first relay device 20A with a list of services which the user U is authorized to use and the stored authentication information. A controller 501 includes a CPU 501A, a ROM 501B, and a RAM 501C. The CPU 501A executes an IPL stored in the ROM 501B, and thus the programs stored in the memory 502 are executed, thereby implementing the functions described above.

The second authentication device 50B has substantially the same hardware configuration as the first authentication device 50A, and the destination to which the communication unit 508 of the second authentication device 50B is connected and the information and programs stored in the memory 502 of the second authentication device 50B are different.

Specifically, the communication unit 508 of the second authentication device 50B is connected to a communication line through which the second authentication device 50B and the second relay device 20B are connected to each other, and communicates with the second relay device 20B.

The memory 502 of the second authentication device 50B stores a program implementing a function to provide the second relay device 20B with a list of services which the user U is authorized to use among the services provided by the service devices 40C and 40D and authentication information for allowing the user U to log into the service devices 40C and 40D.

Figure 4A:
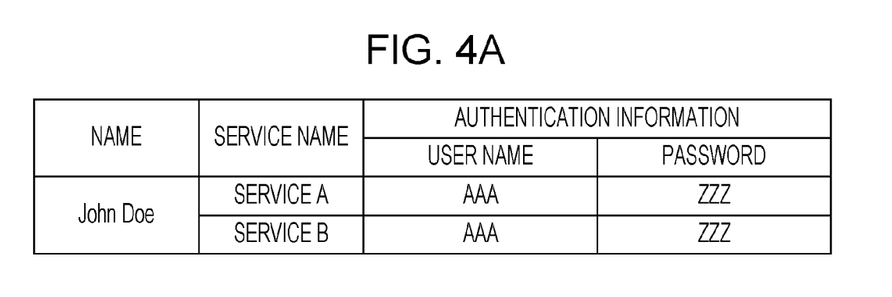
FIGS. 4A and 4B illustrate examples of authentication information.
Figure 4B:
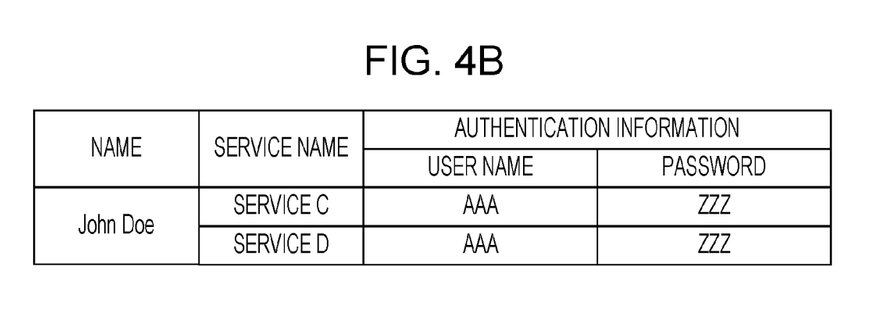

The memory 502 of the second authentication device 50B further stores the name of a service which the user U is authorized to use among the services provided by the service devices 40C and 40D, and authentication information for allowing the user U to log into the service devices 40C and 40D. FIG. 4A illustrates an example of the authentication information stored in the memory 502 of the first authentication device 50A, and FIG. 4B illustrates an example of the authentication information stored in the memory 502 of the second authentication device 50B.

As illustrated in FIG. 4A, the memory 502 of the first authentication device 50A stores, in association with the name of the user U, the names of the services which the user U is authorized to use, the user names and passwords used when the user U logs into the service devices 40 that provide the services which the user U is authorized to use, and so forth.

For example, the user U has the name "John Doe", and the user U is authorized to use the service A and the service B. In this case, as illustrated in FIG. 4A, the service names "service A" and "service B" are stored in association with the name "John Doe". In addition, the user name "AAA" and the password "ZZZ", which are authentication information used when the user U logs into the service device 40A that provides the service A, are stored in association with the service name "service A". Furthermore, the user name "AAA" and the password "ZZZ", which are authentication information used when the user U logs into the service device 40B that provides the service B, are stored in association with the service name "service B". The authentication information used to log into the service device 40B may be different from the authentication information used to log into the service device 40A. The stored name may be identical to the user name in the authentication information.

Similarly, the memory 502 of the second authentication device 50B stores, in association with the name of the user U, the names of the services which the user U is authorized to use, the user names and passwords used when the user U logs into the service devices 40 that provide the services which the user U is authorized to use, and so forth.

For example, the user U is authorized to use the service C and the service D. In this case, as illustrated in FIG. 4B, the service names "service C" and "service D" are stored in association with the name "John Doe". In addition, the user name "AAA" and the password "ZZZ", which are authentication information used when the user U logs into the service device 40C that provides the service C, are stored in association with the service name "service C". Furthermore, the user name "AAA" and the password "ZZZ", which are authentication information used when the user U logs into the service device 40D that provides the service D, are stored in association with the service name "service D". The authentication information used to log into the service device 40C may be different from the authentication information used to log into the service device 40D. The stored name may be identical to the user name in the authentication information. Additionally, the authentication information used to log into the service device 40C and the authentication information used to log into the service device 40D may be different from the authentication information used to log into the service device 40A or the authentication information used to log into the service device 40B.

Configuration of First Relay Device 20A and Second Relay Device 20B

Figure 5:
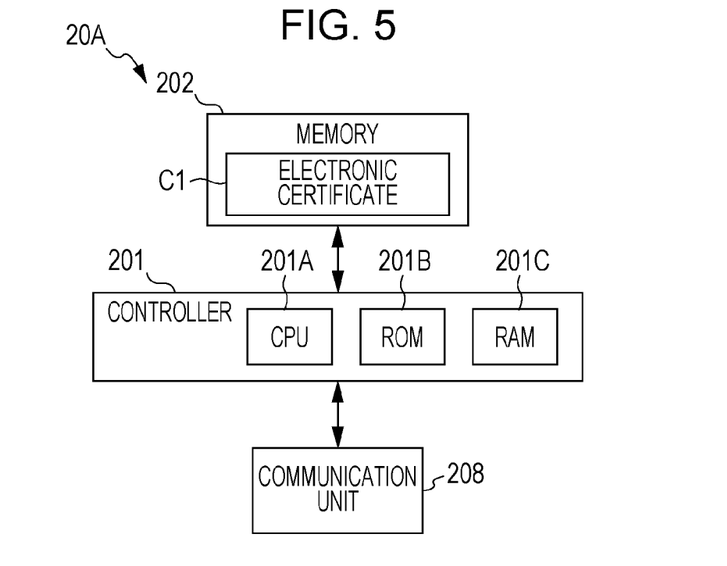
FIG. 5 illustrates a hardware configuration of a relay device.

FIG. 5 illustrates a hardware configuration of the first relay device 20A. A communication unit 208 is connected to the network 60, a communication line through which the first authentication device 50A and the first relay device 20A are connected to each other, or the like, and communicates with another device via the connected communication line.

A memory 202 has a hard disk device, and stores a program implementing an operating system, and programs implementing a function to perform communication using a public-key cryptosystem, a function to transfer information received by the communication unit 208, a function to provide a list of services which the user U is authorized to use, and any other suitable function. The memory 202 further stores an electronic certificate C1, which is an example of an electronic certificate of the first relay device 20A. The memory 202 further stores the name of the user U which is written in the personal certificate C3.

A controller 201 includes a CPU 201A, a ROM 201B, and a RAM 201C. The CPU 201A executes an IPL stored in the ROM 201B, and thus the programs stored in the memory 202 are executed, thereby implementing the functions described above.

The second relay device 20B has substantially the same hardware configuration as the first relay device 20A, and the destination to which the communication unit 208 of the second relay device 20B is connected and the information stored in the memory 202 of the second relay device 20B is different. The communication unit 208 of the second relay device 20B is connected to the network 60 and the network 61. The memory 202 of the second relay device 20B stores an electronic certificate C2, which is an example of an electronic certificate of the second relay device 20B.

Figure 6:
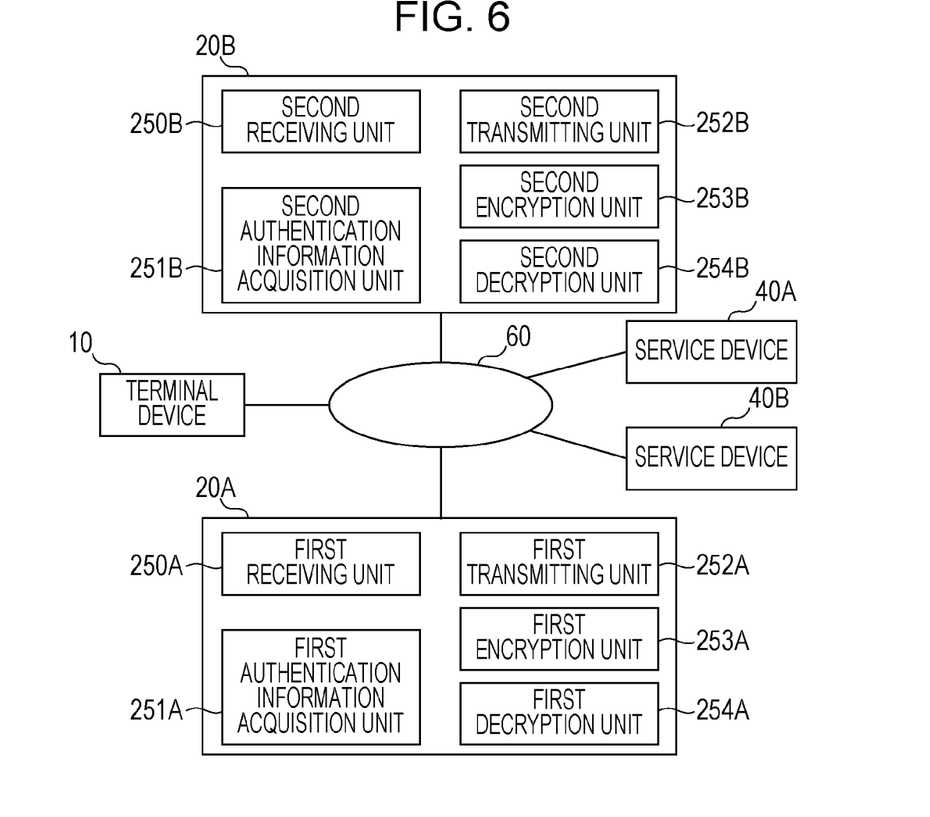
FIG. 6 illustrates functions implemented in the exemplary embodiment of the present invention.

FIG. 6 is a functional block diagram illustrating characteristic functions according to this exemplary embodiment among the functions which may be achieved by the first relay device 20A and the second relay device 20B. As illustrated in FIG. 6, in the first relay device 20A, the CPU 201A executes a program, thereby implementing a first receiving unit 250A, a first authentication information acquisition unit 251A, a first transmitting unit 252A, a first encryption unit 253A, and a first decryption unit 254A. The first receiving unit 250A cooperates with the communication unit 208 to function as a first receiver configured to receive information transmitted from another device. The first authentication information acquisition unit 251A cooperates with the communication unit 208 to function as a first authentication information acquisition unit configured to acquire authentication information from the first authentication device 50A. The first transmitting unit 252A cooperates with the communication unit 208 to function as a first transmitter configured to transmit information to the service devices 40, the second relay device 20B, the first authentication device 50A, the terminal device 10, and so forth. The first encryption unit 253A functions as a first encryption unit configured to encrypt information to be transmitted. The first decryption unit 254A functions as a first decryption unit configured to decrypt the received encrypted information using the private key of the first relay device 20A.

In the second relay device 20B, the CPU 201A executes a program, thereby implementing a second receiving unit 250B, a second authentication information acquisition unit 251B, a second transmitting unit 252B, a second encryption unit 253B, and a second decryption unit 254B. The second receiving unit 250B cooperates with the communication unit 208 to function as a second receiver configured to receive information transmitted from another device. The second authentication information acquisition unit 251B cooperates with the communication unit 208 to function as a second authentication information acquisition unit configured to acquire authentication information from the second authentication device 50B. The second transmitting unit 252B cooperates with the communication unit 208 to function as a second transmitter configured to transmit information to the service devices 40, the first relay device 20A, the second authentication device 50B, and so forth. The second encryption unit 253B functions as a second encryption unit configured to encrypt information to be transmitted. The second decryption unit 254B functions as a second decryption unit configured to decrypt the received encrypted information using the private key of the second relay device 20B.

Example of Operation According to this Exemplary Embodiment

Next, an example of the operation according to an exemplary embodiment of the present invention will be described. In the following description of an example of the operation, it is assumed that the terminal device 10 trusts, in advance, a certificate authority that has issued the electronic certificate C1 and a certificate authority that has issued the electronic certificate C2, and that the first relay device 20A and the second relay device 20B trust, in advance, a certificate authority that has issued the personal certificate C3. In the following description, it is also assumed that authentication information for allowing the user U to use a service of the service device 40 is stored in advance in the service device 40, the first authentication device 50A, and the second authentication device 50B.

Figure 7:
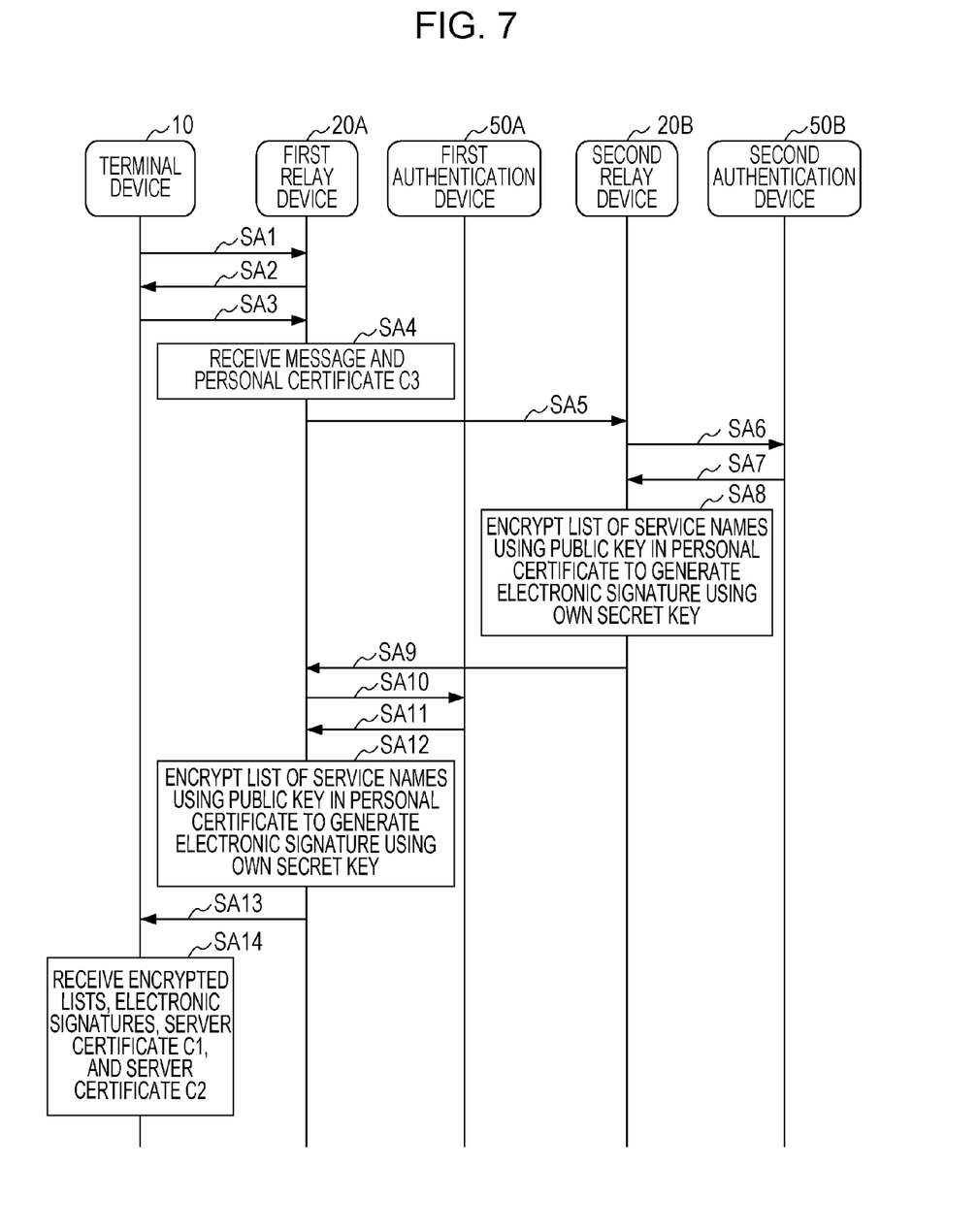
FIG. 7 is a sequence diagram illustrating an example of the operation according to the exemplary embodiment.

Example of Operation for Acquiring List of Services which User is Authorized to Use FIG. 7 illustrates the operation for selecting a service to be used by the user U. In order to use a service provided by the service device 40, the user U operates the terminal device 10 on which a web browser is running, and accesses the first relay device 20A (step SA1). In response to access from the terminal device 10, the first relay device 20A transmits a message requesting the personal certificate C3 to the terminal device 10 (step SA2). Upon receiving the message transmitted in step SA2, the terminal device 10 transmits the personal certificate C3 stored therein and a message requesting a list of services to the first relay device 20A (step SA3).

The first relay device 20A receives the personal certificate C3 and the message which are transmitted in step SA3 (step SA4). In a case where the certificate authority of the received personal certificate C3 is a certificate authority trusted in advance and the name (the name of the user U) written in the personal certificate C3 as the entity to which the personal certificate C3 is issued is stored in the memory 202, the first relay device 20A transmits the received personal certificate C3 and message to the second relay device 20B (step SA5). If the certificate authority of the personal certificate C3 is not a certificate authority trusted in advance, the first relay device 20A disconnects the connection to the terminal device 10.

Upon receiving the personal certificate C3 and message transmitted in step SA5, the second relay device 20B transmits the received message and the name (in the illustrated example of the operation, "John Doe") written in the received personal certificate C3 as the entity to which the personal certificate C3 is issued to the second authentication device 50B (step SA6). Upon receiving the name and message transmitted in step SA6, the second authentication device 50B acquires the service name stored in association with the received name from the memory 502, and transmits the acquired service name to the second relay device 20B (step SA7).

Here, the name received by the second authentication device 50B is "John Doe". In this case, as illustrated in FIG. 4B, since the service names "service C" and "service D" are stored in association with the name "John Doe", the service C and the service D are transmitted from the second authentication device 50B to the second relay device 20B.

The second relay device 20B creates a list of service names transmitted in step SA7, and encrypts the created list using the public key included in the personal certificate C3. The second relay device 20B further encrypts a message digest of the encrypted list using the private key of the second relay device 20B to generate an electronic signature (step SA8). Then, the second relay device 20B transmits the encrypted list, the electronic signature, and the electronic certificate C2 to the first relay device 20A (step SA9).

Note that the second relay device 20B, which has received the personal certificate C3 transmitted in step SA5, may check whether the certificate authority of the personal certificate C3 is a certificate authority trusted in advance, the processing of step SA6 may be performed if the certificate authority of the personal certificate C3 is a certificate authority trusted in advance, and the processing of step SA9 may not be performed if the certificate authority of the personal certificate C3 is not a certificate authority trusted in advance.

The first relay device 20A receives the encrypted list, the electronic signature, and the electronic certificate C2 which are transmitted in step SA9. Then, the first relay device 20A transmits the message received in step SA4 and the name (in the illustrated example of the operation, "John Doe") written in the personal certificate C3 received in step SA4 as the entity to which the personal certificate C3 is issued to the first authentication device 50A (step SA10). Upon receiving the name and message transmitted in step SA10, the first authentication device 50A acquires the service name stored in association with the received name from the memory 502, and transmits the acquired service name to the first relay device 20A (step SA11).

Here, the name received by the first authentication device 50A is "John Doe". In this case, as illustrated in FIG. 4A, since the service names "service A" and "service B" are stored in association with the name "John Doe", the service A and the service B are transmitted from the first authentication device 50A to the first relay device 20A.

The first relay device 20A creates a list of service names transmitted in step SA11, and encrypts the created list using the public key included in the personal certificate C3. The first relay device 20A further encrypts a message digest of the encrypted list using the private key of the first relay device 20A to generate an electronic signature (step SA12).

Then, the first relay device 20A transmits the encrypted list received in step SA9, the electronic signature received in step SA9, the electronic certificate C2 received in step SA9, the encrypted list generated in step SA12, the electronic signature generated in step SA12, and the electronic certificate C1 to the terminal device 10 (step SA13). The terminal device 10 receives the encrypted lists, the electronic signatures, the electronic certificate C1, and the electronic certificate C2 which are transmitted in step SA13 (step SA14).

Example of Operation for Selecting Service to be Used from List

Figure 8:
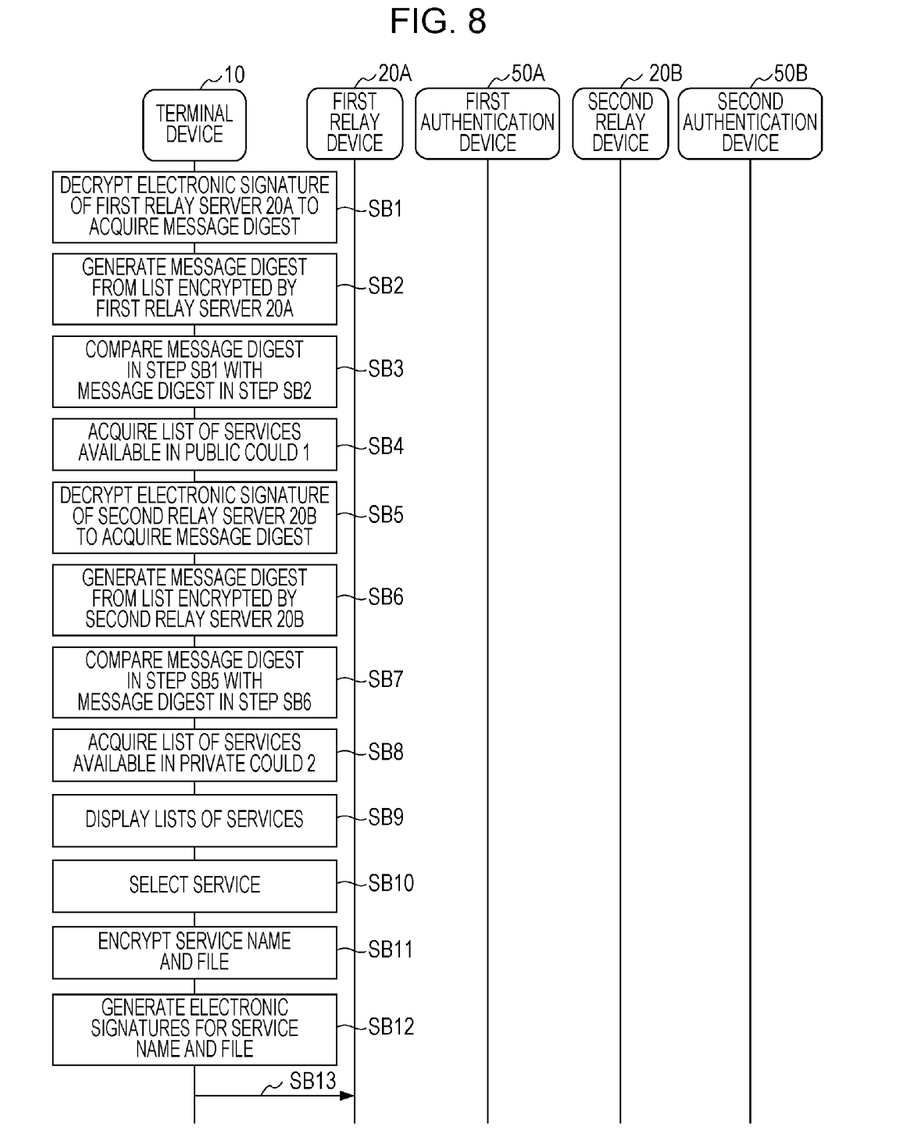
FIG. 8 is a sequence diagram illustrating an example of the operation according to the exemplary embodiment.

Next, an example of the operation for selecting a service to be used by the user U from the list after step SA14 will be described with reference to FIG. 8.

The terminal device 10 verifies the electronic signature generated by the first relay device 20A among the electronic signatures received in step SA14. Specifically, the terminal device 10 decrypts the electronic signature generated by the first relay device 20A using the public key included in the received electronic certificate C1 to acquire a message digest (step SB1). Then, the terminal device 10 generates a message digest from the encrypted list generated by the first relay device 20A (step SB2). The terminal device 10 compares the message digest generated in step SB2 with the message digest acquired in step SB1, and determines that there is no tampering if they match (step SB3).

If it is determined that there is no tampering, the terminal device 10 decrypts the list encrypted by the first relay device 20A, that is, the list encrypted using the public key in the personal certificate C3, using the private key of the user U. Thus, the terminal device 10 acquires a list of services available in the public cloud 1 (step SB4).

Then, the terminal device 10 verifies the electronic signature generated by the second relay device 20B among the electronic signatures received in step SA14. Specifically, the terminal device 10 decrypts the electronic signature generated by the second relay device 20B using the public key included in the received electronic certificate C2 to acquire a message digest (step SB5). Then, the terminal device 10 generates a message digest from the encrypted list generated by the second relay device 20B (step SB6). The terminal device 10 compares the message digest generated in step SB6 with the message digest acquired in step SB5, and determines that there is no tampering if they match (step SB7).

If it is determined in step SB7 that there is no tampering, the terminal device 10 decrypts the list encrypted by the second relay device 20B, that is, the list encrypted using the public key in the personal certificate C3, using the private key of the user U. Thus, the terminal device 10 acquires a list of services available in the private cloud 2 (step SB8).

The terminal device 10 displays the lists acquired in step SB4 and step SB8 (step SB9). The user of the terminal device 10 performs an operation for selecting a service to be used from among the displayed lists (step SB10). The terminal device 10 encrypts the service name of the service selected by the user and a file used in the selected service using the public key included in the associated one of the electronic certificates received in step SA14 (step SB11).

For example, if the user selects a service provided by the service device 40A or the service device 40B, the terminal device 10 encrypts the service name of the service selected by the user and a file used in the selected service using the public key included in the electronic certificate C1. If the user selects a service provided by the service device 40C or the service device 40D, the terminal device 10 encrypts the service name of the service selected by the user and a file used in the selected service using the public key included in the electronic certificate C2.

Then, the terminal device 10 encrypts a message digest of the encrypted service name using the private key of the user U to generate an electronic signature for the service name, and encrypts a message digest of the encrypted file using the private key of the user U to generate an electronic signature for the file (step SB12).

The terminal device 10 transmits the encrypted service name, the encrypted file, the electronic signatures generated in step SB12, and the personal certificate C3 to the first relay device 20A (step SB13). The first relay device 20A receives the encrypted service name, the encrypted file, the electronic signatures generated in step SB12, and the personal certificate C3.

Figure 9:
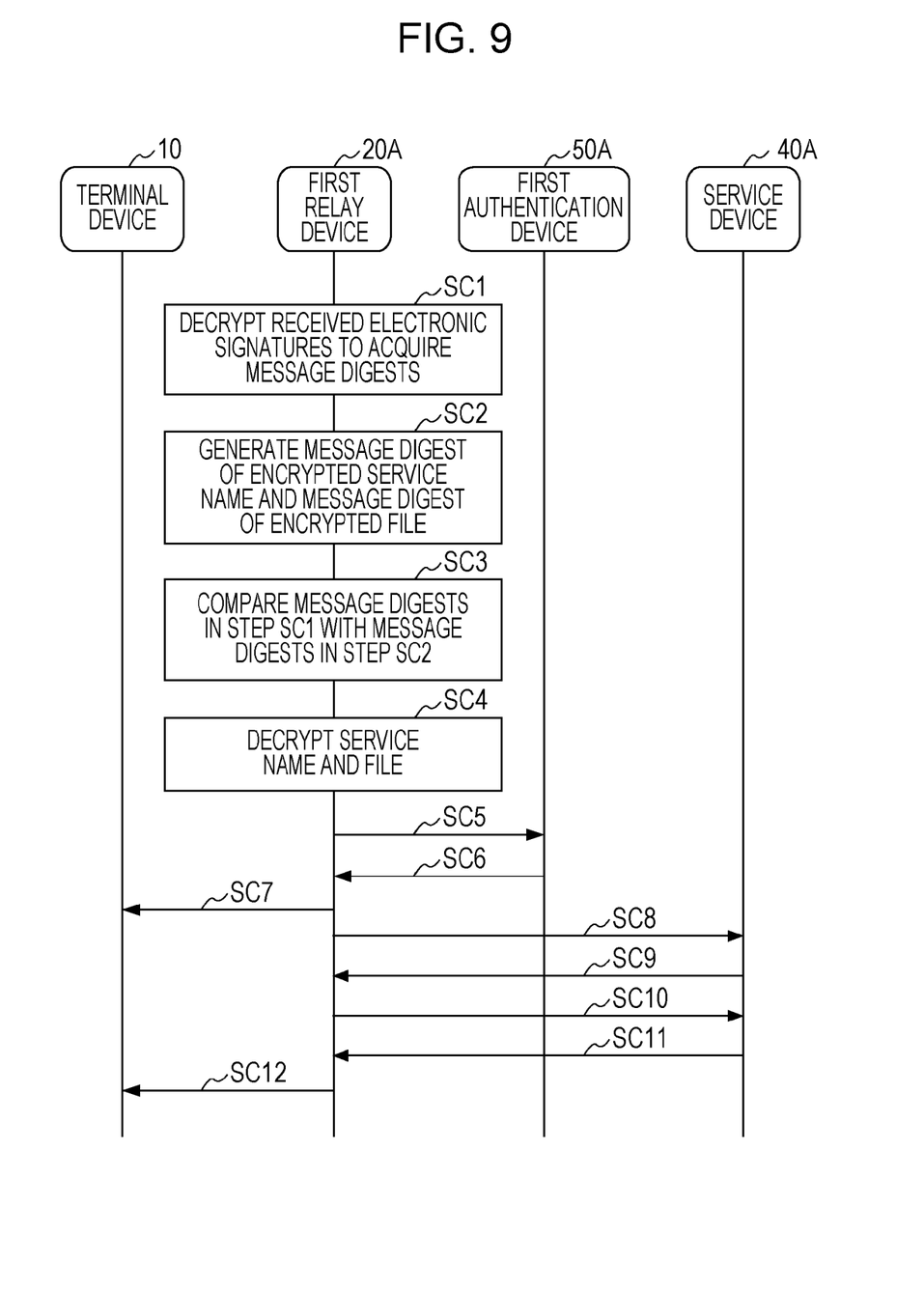
FIG. 9 is a sequence diagram illustrating an example of the operation according to the exemplary embodiment.

Example of Operation when User Selects Service Provided by Service Device 40A or 40B Next, an example of the operation in a case where the user selects a service provided by the service A or the service B will be described with reference to FIG. 9. First, the first relay device 20A decrypts the electronic signatures transmitted in step SB13 using the public key included in the personal certificate C3 transmitted in step SB13 to acquire a message digest of the service name and a message digest of the file (step SC1). Then, the first relay device 20A generates a message digest from the encrypted service name transmitted in step SB13. The first relay device 20A further generates a message digest from the encrypted file transmitted in step SB13 (step SC2).

The first relay device 20A compares the message digest of the service name generated in step SC2 with the message digest of the service name acquired in step SC1, and determines that there is no tampering with the service name if they match. The first relay device 20A further compares the message digest of the file generated in step SC2 with the message digest of the file acquired in step SC1, and determines that there is no tampering with the file if they match (step SC3).

If there is no tampering with the service name and the file, the first relay device 20A decrypts the received service name and file using the private key of the first relay device 20A (step SC4). If the service name has been successfully obtained through decryption using the private key of the first relay device 20A, the first relay device 20A acquires from the first authentication device 50A the authentication information associated with the name written in the personal certificate C3 transmitted in step SB13 and the service name obtained through decryption (step SC5, step SC6).

For example, the name written in the personal certificate C3 is "John Doe", and the service name is "service A". In this case, the first relay device 20A acquires the user name "AAA" and the password "ZZZ" from the first authentication device 50A.

Upon acquiring authentication information, the first relay device 20A acquires the electronic mail address included in the received personal certificate C3, and transmits an electronic mail indicating that the service starts to be used to the acquired electronic mail address as the forwarding address (step SC7).

Then, the first relay device 20A transmits the authentication information acquired in step SC6 to the service device 40 that provides the service identified by the service name obtained through decryption, and attempts a login to the service device 40 (step SC8). For example, as described above, the service name obtained through decryption is "service A", the user name acquired in step SC6 is "AAA", and the password acquired in step SC6 is "ZZZ". In this case, the first relay device 20A transmits the user name "AAA" and the password "ZZZ" to the service device 40A.

Upon receiving authentication information, or a set of user name and password, the service device 40 transmits a message indicating permission to use the service to the first relay device 20A if the received set has been stored (step SC9). For example, as described above, the user name "AAA" and the password "ZZZ" are transmitted to the service device 40A, and the service device 40A has stored therein the set of user name and password. In this case, a message indicating permission to use the service is transmitted from the service device 40A to the first relay device 20A.

Upon receiving the message transmitted in step SC9, the first relay device 20A transmits the decrypted file to the service device 40 to which the login has been made (step SC10). For example, in a case where the login has been made to the service device 40A, the first relay device 20A transmits the decrypted file to the service device 40A.

Upon receiving the file, the service device 40 transmits the result of processing the file to the first relay device 20A (step SC11). For example, the service device 40A has received the file, and has correctly saved the received file therein. In this case, the service device 40A transmits a message indicating that the file has been correctly saved to the first relay device 20A.

Upon receiving the message transmitted in step SC11, the first relay device 20A acquires the electronic mail address included in the received personal certificate C3, and transmits an electronic mail indicating the processing result indicated by the received message to the acquired electronic mail address as the forwarding address (step SC12).

Figure 10:
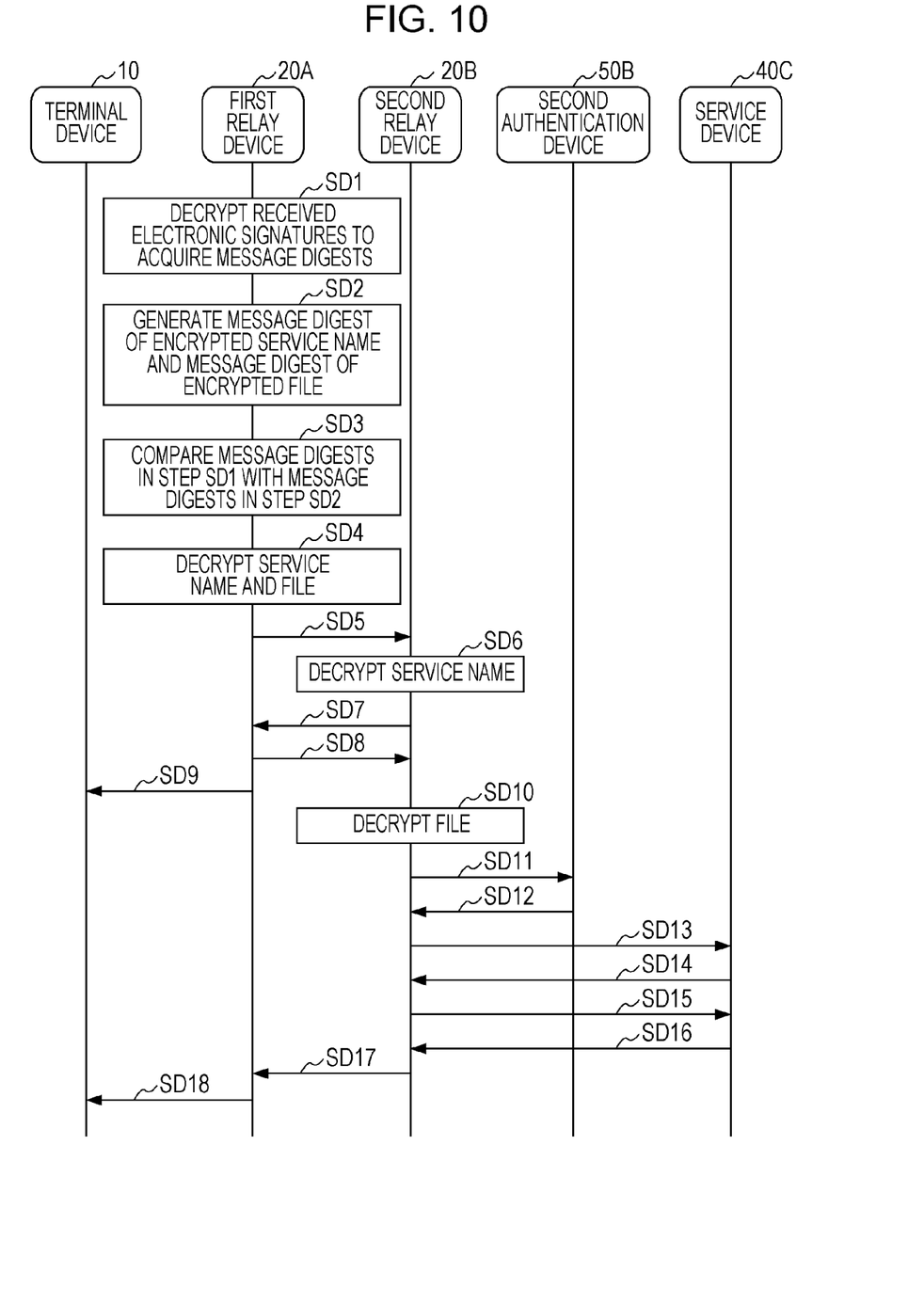
FIG. 10 is a sequence diagram illustrating an example of the operation according to the exemplary embodiment.

Example of Operation when User Selects Service Provided by Service Device 40C or 40D Next, an example of the operation in a case where the user selects a service provided by the service C or the service D will be described with reference to FIG. 10. First, the first relay device 20A decrypts the electronic signatures transmitted in step SB13 using the public key included in the personal certificate C3 transmitted in step SB13 to acquire a message digest of the service name and a message digest of the file (step SD1). Then, the first relay device 20A generates a message digest from the encrypted service name transmitted in step SB13. The first relay device 20A further generates a message digest from the encrypted file transmitted in step SB13 (step SD2).

The first relay device 20A compares the message digest of the service name generated in step SD2 with the message digest of the service name acquired in step SD1, and determines that there is no tampering with the service name if they match. The first relay device 20A further compares the message digest of the file generated in step SD2 with the message digest of the file acquired in step SD1, and determines that there is no tampering with the file if they match (step SD3).

If there is no tampering with the service name and the file, the first relay device 20A decrypts the received service name and file using the private key of the first relay device 20A (step SD4). If the service name has not been successfully obtained through decryption using the private key of the first relay device 20A, the first relay device 20A transmits the encrypted service name to the second relay device 20B (step SD5).

The second relay device 20B receives the encrypted service name transmitted in step SD5, and decrypts the received service name using the private key of the second relay device 20B (step SD6). If the service name has been successfully obtained through decryption using the private key of the second relay device 20B, the second relay device 20B transmits a message indicating that the decryption has been successful to the first relay device 20A (step SD7).

Upon receiving the message transmitted in step SD7, the first relay device 20A transmits the encrypted file and the personal certificate C3 which are received in step SB13 to the second relay device 20B (step SD8). The first relay device 20A further acquires the electronic mail address included in the personal certificate C3 received in step SB13, and transmits an electronic mail indicating that the service starts to be used to the electronic mail address as the forwarding address (step SD9).

The second relay device 20B receives the encrypted file and the personal certificate C3 which are transmitted in step SD8. The second relay device 20B decrypts the received file using the private key of the second relay device 20B (step SD10). Then, the second relay device 20B acquires from the second authentication device 50B the authentication information associated with the name written in the received personal certificate C3 and the service name obtained through decryption in step SD6 (step SD11, step SD12).

For example, the name written in the personal certificate C3 is "John Doe", and the service name is "service C". In this case, the second relay device 20B acquires the user name "AAA" and the password "ZZZ" from the second authentication device 50B.

Then, the second relay device 20B transmits the authentication information acquired in step SD12 to the service device 40 that provides the service identified by the service name obtained through decryption, and attempts a login to the service device 40 (step SD13). For example, as described above, the service name obtained through decryption is "service C", the user name acquired in step SD12 is "AAA", and the password acquired in step SD12 is "ZZZ". In this case, the second relay device 20B transmits the user name "AAA" and the password "ZZZ" to the service device 40C.

Upon receiving authentication information, or a set of user name and password, the service device 40 transmits a message indicating permission to use the service to the second relay device 20B if the received set has been stored (step SD14). For example, as described above, the user name "AAA" and the password "ZZZ" are transmitted to the service device 40C, and the service device 40C has stored therein the set of user name and password. In this case, a message indicating permission to use the service is transmitted from the service device 40C to the second relay device 20B.

Upon receiving the message transmitted in step SD14, the second relay device 20B transmits the file decrypted in step SD10 to the service device 40 to which the login has been made (step SD15). For example, in a case where the login has been made to the service device 40C, the second relay device 20B transmits the decrypted file to the service device 40C.

Upon receiving the file, the service device 40 transmits the result of processing the file to the second relay device 20B (step SD16). For example, the service device 40C has received the file, and has correctly translated the received file. In this case, the service device 40C transmits a message indicating that the translation has been correctly performed to the second relay device 20B.

The second relay device 20B transmits the message transmitted in step SD16 to the first relay device 20A (step SD17). Upon receiving the message transmitted in step SD17, the first relay device 20A acquires the electronic mail address included in the received personal certificate C3, and transmits an electronic mail indicating the processing result indicated by the received message to the acquired electronic mail address as the forwarding address (step SD18).

EXEMPLARY MODIFICATIONS

While an exemplary embodiment of the present invention has been described, the present invention is not limited to the exemplary embodiment described above, and other exemplary embodiments may also be used. For example, the exemplary embodiment described above may be modified in the following way to implement the present invention. The exemplary embodiment described above and the following exemplary modifications may be used in combination.

In the exemplary embodiment described above, the first relay device 20A transmits an electronic mail to the terminal device 10. However, the first relay device 20A may not necessarily transmit an electronic mail.

In the exemplary embodiment described above, the name of the user U which is written in the personal certificate C3 of the user U may be stored in the second relay device 20B. In this configuration, in a case where the second relay device 20B does not have stored therein the name written in the received personal certificate C3, the second relay device 20B may not necessarily transmit a list of service names to the first relay device 20A.

In the exemplary embodiment described above, the first relay device 20A and the first authentication device 50A are provided. The first relay device 20A and the first authentication device 50A may be formed into an integrated unit. Furthermore, in the exemplary embodiment described above, the second relay device 20B and the second authentication device 50B are provided. The second relay device 20B and the second authentication device 50B may be formed into an integrated unit.

The programs described above may be provided in the form of being stored in a computer-readable recording medium such as a magnetic recording medium (such as a magnetic tape or a magnetic disk (such as a hard disk drive (HDD) or a flexible disk (FD))), an optical recording medium (such as an optical disk), a magneto-optical recording medium, or a semiconductor memory, and may be installed into an individual device. The programs may also be downloaded into an individual device via a communication line, and may be installed into the device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system comprising:
a first relay device connected to a first network accessible by a specific user and a user other than the specific user; and
a second relay device connected to a second network and the first network accessible by the specific user,
the first relay device including
a first receiver that receives an electronic certificate transmitted from a terminal device of the specific user,
at least one first processor implementing a first authentication information acquisition unit that acquires, from a first memory, authentication information associated with a name written in the electronic certificate received by the first receiver, the first memory being provided in the first network and storing the authentication information, and
a first transmitter that transmits the authentication information acquired by the first authentication information acquisition unit to a service device and that transmits the electronic certificate received by the first receiver to the second relay device, the service device being connected to the first network and configured to provide a service,
the second relay device including
a second receiver that receives the electronic certificate transmitted by the first transmitter,
at least one second processor implementing a second authentication information acquisition unit that acquires, from a second memory, authentication information associated with a name written in the electronic certificate received by the second receiver, the second memory being provided in the second network and storing the authentication information, and
a second transmitter that transmits the authentication information acquired by the second authentication information acquisition unit to a service device, the service device being connected to the second network and configured to provide a service.

2. The communication system according to claim 1, wherein
the at least one second processor of the second relay device further implements
a second encryption unit that encrypts information to be transmitted to the terminal device using a public key included in the electronic certificate received by the second receiver,
the second transmitter transmits the information encrypted by the second encryption unit to the first relay device,
the first receiver of the first relay device receives the encrypted information transmitted by the second transmitter,
at least one first processor of the first relay device further implements
a first encryption unit that encrypts information to be transmitted to the terminal device, other than the encrypted information received by the first receiver, using the public key included in the electronic certificate, and
the first transmitter transmits the information encrypted by the first encryption unit to the terminal device, and transmits the encrypted information received by the first receiver to the terminal device.

3. The communication system according to claim 2, wherein
the second encryption unit generates an electronic signature from the information encrypted by the second encryption unit and a private key of the second relay device,
the second transmitter transmits the information encrypted by the second encryption unit, the electronic signature, and an electronic certificate of the second relay device to the first relay device,
the first receiver receives the encrypted information transmitted by the second transmitter, the electronic signature, and the electronic certificate of the second relay device, and
the first transmitter transmits the encrypted information received by the first receiver, the electronic signature, and the electronic certificate of the second relay device to the terminal device.

4. The communication system according to claim 3, wherein
the first encryption unit generates an electronic signature from the information encrypted by the first encryption unit and a private key of the first relay device, and
the first transmitter transmits the information encrypted by the first encryption unit, the electronic signature generated by the first encryption unit, and an electronic certificate of the first relay device to the terminal device.

5. The communication system according to claim 4, wherein
the terminal device encrypts information to be transmitted to a device connected to the second network using a public key of the second relay device, and transmits the encrypted information to the first relay device,
the first receiver receives the information encrypted using the public key of the second relay device, and the first transmitter transmits the information encrypted using the public key of the second relay device, which is received by the first receiver, to the second relay device.

* * * * *